(12) United States Patent
Nakano et al.

(10) Patent No.: US 6,424,726 B2
(45) Date of Patent: Jul. 23, 2002

(54) IMAGE DATA ENCODING SYSTEM AND IMAGE INPUTTING APPARATUS

(75) Inventors: Hirotaka Nakano; Masahiro Hashimoto; Koji Manabe, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/907,256

(22) Filed: Jul. 17, 2001

Related U.S. Application Data

(63) Continuation of application No. 09/022,885, filed on Feb. 12, 1998.

(30) Foreign Application Priority Data

| Feb. 14, 1997 | (JP) | ................................. 9-029992 |
| Feb. 17, 1997 | (JP) | ................................. 9-032212 |
| Mar. 12, 1997 | (JP) | ................................. 9-057469 |

(51) Int. Cl.[7] ................................. G06K 9/00
(52) U.S. Cl. ................................. 382/100; 382/251
(58) Field of Search ................................. 382/100, 115, 382/116, 119, 137, 138, 232, 238, 246, 250, 251, 248; 380/210, 252, 287, 51, 54; 713/176; 370/527, 529

(56) References Cited

U.S. PATENT DOCUMENTS

| 4,669,344 A | 6/1987 | Herrig |
| 5,488,664 A | 1/1996 | Shamir |
| 5,530,759 A | 6/1996 | Braudaway et al. |
| 5,805,482 A | 9/1998 | Phillips |
| 5,809,139 A | 9/1998 | Girod et al. |
| 5,848,155 A | 12/1998 | Cox |

(List continued on next page.)

FOREIGN PATENT DOCUMENTS

| JP | 4-351164 | 12/1992 |
| JP | 6-22062 | 1/1994 |
| JP | 6-22119 | 1/1994 |
| JP | 8-241403 | 9/1996 |
| KR | 10-1998-0004263 | 10/1998 |

OTHER PUBLICATIONS

Frank Hartung et al, "Watermarking of MPEG–2 encoded video without decoding and re–encoding", Multimedia Computing and Networking, Proceedings of the Spie, vol. 3020, Feb. 10–11, 1997, pp. 264–274.

Adrian G. Bors et al, "Image Watermarking Using DCT Domain Constraints", Proceedings of 3rd IEEE International Conference on Image Processing, vol. 3, Sep. 16–19, 1996, pp. 231–234.

(List continued on next page.)

*Primary Examiner*—Andrew W. Johns
*Assistant Examiner*—Amir Alavi
(74) *Attorney, Agent, or Firm*—Foley & Lardner

(57) ABSTRACT

An image data encoding system is disclosed, that comprises a discrete cosine transforming means for discrete-cosine transforming the original image, an electronic watermark data embedding means for embedding the electronic watermark data in the data that has been transformed by the discrete cosine transforming means, and a data selecting means for selecting the output signal of the discrete cosine transforming means or the output signal of the electronic watermark data embedding means. Another image data encoding system is also disclosed, that comprises an electronic watermark embedding means for embedding electronic watermark data selected from a plurality of types of electronic watermark data to the digital image data, wherein at least one of the plurality of types of electronic watermark data is predetermined electronic watermark data that does not affect the digital image data even if the electronic watermark data is embedded in the digital image data.

28 Claims, 11 Drawing Sheets

U.S. PATENT DOCUMENTS 5,930,369 A * 7/1999 Cox et al. ................... 380/54
6,002,772 A * 12/1999 Saito ........................... 380/49
6,064,737 A * 5/2000 Rhoads ....................... 380/23
6,131,161 A * 10/2000 Linnartz ..................... 713/176
6,330,335 B1 * 12/2001 Rhoads ....................... 380/252

OTHER PUBLICATIONS

Nikkei Electronics, "NEC Developed a Method of Embedding ID Information to Copyrighted Works" Apr. 22, 1996, p. 13, No. 660 (Translation).

* cited by examiner

IMAGE DATA ENCODING SYSTEM AND IMAGE INPUTTING APPARATUS

This is a Continuation Application of application Ser. No. 09/022,885, filed Feb. 12, 1998.

BACKGROUND OF THE INVENTION

1. Field of the Invention

The present invention relates to a digital image processing system and, in particular, to an image data encoding system for embedding identification data with special information (hereinafter, referred to as electronic watermark data) to a digital image. In addition, the present invention relates to an image inputting apparatus for use in, for example, a personal computer and, in particular, to an image inputting apparatus equipped with an illegal copy prohibiting function.

2. Description of the Related Art

In recent years, the act of illegally copying digital images causes a social problem.

To prevent digital images from being illegally copied, an encryption system has been proposed. In this system, digital image data is encrypted. Only a reproducing system with a valid decryption key can reproduce the encrypted digital image data. However, in such a system, once encrypted data is decrypted, there is no way to prevent the data from being copied any more.

The purpose of a conventional illegal copy prohibiting method for an image inputting apparatus was to prevent the instance of copying image data.

FIG. 9 is a block diagram showing an example of an image inputting apparatus equipped with a conventional illegal copy prohibiting function. An input image is supplied to image pickup means 901, analog-to-digital converting means 902, converting means 903, quantizing means 904, and variable-length encoding means 905. After the input image is converted into compressed image data such as an MPEG data stream, the resultant data is supplied to scrambling means 906. Scrambling means 906 scrambles the input data and outputs compressed and scrambled image data. The compressed and scrambled image data can be reproduced only by an apparatus with a de-scrambling function.

As explained above, in the conventional system, images are scrambled to be prevented from being illegally copied.

In the conventional system, once scrambled images were descrambled, it was impossible to prevent them from being illegally copied.

In addition to such a conventional system, in order to prevent bills and securities from being illegally copied, a method for embedding identification information in pixel components of an image has been proposed in, for example, Japanese Patent Laid-Open Publication Nos. 4-351164, 6-22062, and 6-22119.

In the method for embedding identification information to pixel components of an image, there was the disadvantage that the identification information could be easily forged and removed.

Therefore, a method for embedding electronic watermark data in a digital image has been proposed to prevent digital images from being illegally used and copied.

There are two types of electronic watermark data for digital images, i.e. visible electronic watermark data and invisible electronic watermark data.

The visible electronic watermark data is composed of special characters or symbols so that it can be recognized by visual sensation. Although the visible electronic watermark data causes deterioration of the image quality, the user of the digital image can distinguish it from a forged one, whereby illegal circulation of bills or securities can be prevented.

An example of a method for embedding visible electronic watermark data in an electronic image is disclosed in Japanese Patent Laid-Open Publication No. 8-241403. In this method, when visible electronic watermark data is combined with an original image, only the brightness of pixels corresponding to an opaque portion of the electronic watermark data is varied, not color components. In this method, scaling values which vary the brightness components of the pixels are determined corresponding to color components, random numbers, pixel values of electronic watermark data, or the like.

On the other hand, the invisible electronic watermark data is embedded in an image in such a manner that the electronic watermark data does not affect the image quality. Thus, since the invisible electronic watermark faintly deteriorates the image quality, the deterioration is not perceivable by visual sensation. When special information that identifies a copyright holder of a original image is embedded in the form of the electronic watermark data, even after the image has been illegally copied, the copyright holder of the image can be identified by detecting the electronic watermark data. In addition, in the case that information inhibiting duplication is embedded in a image in the form of electric watermark data, when a relevant reproducing unit such as VTR detects the information, the unit can inform the user that the duplication of the image is inhibited or the unit can prevent duplication of the image by activating duplication inhibiting mechanism.

As one method for embedding invisible electronic watermark data in a digital image, special information representing invisible electronic watermark is embedded in a portion where the information faintly affects the picture quality such as the least significant bits (LSBs) of pixel data. However, in this method, it is easy to erase the electronic watermark data from the image. For example, with a low-pass filter, the information of LSBs of the pixel data can be removed. Additionally, in the image compressing process, redundant data that faintly affects the image quality is removed so as to reduce the data amount and the electric watermark data is embedded in the place where redundant data exists. Thus, when the image compressing process is performed, the electronic watermark data is lost. Consequently, it is difficult to detect the electronic watermark data of an image that has been compressed.

To solve this problem, a method for transforming an image into frequency components and embedding electronic watermark data in the frequency spectrum has been proposed (Nikkei Electronics, p. 13, No. 660, Apr. 22, 1996). In this method, since electronic watermark data is embedded in frequency components, even if an image process such as a compressing process or a filtering process is performed for an image, the electronic watermark data is not lost. In addition, when random numbers that follow a normal distribution are used as electronic watermark data, different pieces of electronic watermark data do not interfere with each other. Thus, it is difficult to destroy the electronic watermark data without largely deteriorating the image.

Referring to FIG. 10, the method for embedding electronic watermark data in an image is performed as follows. First of all, a discrete cosine transforming means 1020 transforms an original image into frequency components. In the frequency components, n components are selected as f(1), f(2), . . . , f(n) according to amplitude order. Electronic watermark data pieces w(1), w(2), . . . , w(n) are extracted from random data following a normal distribution with means=0 and variance=1. An electronic watermark data embedding means 1030 calculates the following equation for each i:

$$F(i)=f(i)+\alpha |f(i)|\cdot w(i),$$

where $1 \leq I \leq n$ and where $\alpha$ is a scaling factor. Finally, image data in which electronic watermark data has been embedded is obtained by transforming F(I) by inverse discrete cosine transform.

The electronic watermark data is detected in the following manner. In this case, it is assumed that the original image and electronic watermark data candidate set {w(i)} (where i=1, 2, . . . n) are known.

With reference to FIG. 11, a discrete cosine transforming means 1120 transforms an image in which electronic watermark data has been embedded into frequency components F(1), F(2), . . . , F(n). A discrete cosine transforming means 1110 transforms original image data into frequency components f(1), f(2), . . . , f(n). With f(i) and F(i), electronic watermark data estimated values W(i) are calculated and extracted by the following equation:

$$W(i)=(F(i)-f(i))/f(i).$$

Next, an inner product calculating means 1140 calculates the statistical similarity of w(i) and W(i) by the following equation:

$$C=W*w/(WD*wD),$$

where W=(W(1), W(2), . . . , W(n)); w=(w(1), w(2), . . . , w(n)); WD=absolute value of vector W; and wD=absolute value of vector w. A statistical similarity determining means 1160 determines that relevant electronic watermark data has been embedded in a relevant image when the value of C is equal to or larger than a predetermined value.

If the copyright holder of images embeds electronic watermark data in the images, the electronic watermark data is effective to check out images that the holder doubts is illegally copied. FIG. 12 is a block diagram showing an image data encoding system with such an electronic watermark data embedding means according to a related art reference. Discrete cosine transforming means 1201 orthogonally transforms the original image data in time domain into data in frequency domain. Electronic data embedding means 1202 embeds electronic watermark data 1202 in the data in frequency domain. Quantizing means 1204 quantizes the data in which the electronic watermark data has been embedded. Encoding means 1205 encodes the quantized data and outputs the resultant MPEG data.

The aforementioned conventional encoding system always embeds electronic watermark data in a relevant image. Although the image faintly deteriorates as the electronic watermark data is embedded in frequency components, it is not that the image does not at all deteriorate. Therefore, another image encoding system having no means for embedding electric watermark data is required when image should not be embedded with electric watermark data, especially when the quality of the image should be valued.

SUMMARY OF THE INVENTION

An object of the present invention is to provide an encoding system that generates not only encoded data of image in which electric watermark data is embedded but also encoded data of image in which electric watermark data is not embedded.

Another object of the present invention is to provide an image inputting apparatus that generates not only encoded data of image in which electric watermark data is embedded but also encoded data of image in which electric watermark data is not embedded.

According to one aspect of the present invention, there is provided an image data encoding system for embedding electronic watermark data to an original image, which comprises: discrete cosine transforming means for discrete-cosine transforming the original image; electronic watermark data embedding means for embedding the electronic watermark data in the data that has been transformed by the discrete cosine transforming means; and data selecting means for selecting the output signal of the discrete cosine transforming means or the output signal of the electronic watermark data embedding means.

The image data encoding system further comprises: a flip-flop connected to the data selecting means, wherein the data selecting means selects the output signal of the discrete cosine transforming means or the output signal of the electronic watermark data embedding means corresponding to information stored in the flip-flop.

In the image data encoding system, the data selecting means selects the output signal of the discrete cosine transforming means or the output signal of the electronic watermark data embedding means corresponding to an external signal.

According to another aspect of the present invention, there is provided an image data encoding system for encoding digital image data in a predetermined encoding manner and outputting the resultant image data, which comprises: an electronic watermark embedding means for embedding electronic watermark data selected from a plurality of types of electronic watermark data to the digital image data, wherein at least one of the plurality of types of electronic watermark data is predetermined electronic watermark data that does not affect the digital image data even if embedded in the digital image data.

In the image data encoding system, the predetermined electronic watermark data is composed of other than random numbers generated by an algorithm corresponding to a normal distribution.

The image data encoding system further comprises: transforming means for transforming the digital image data into frequency components and outputting the resultant data to the electronic watermark data embedding means; quantizing means for quantizing the data in which electronic watermark data has been embedded by the electronic watermark data embedding means; and a variable-length encoding means for encoding output data of the quantizing means into variable-length code.

According to still another aspect of the present invention, there is provided an image data encoding system for encoding digital image data in a predetermined manner and outputting the resultant data, comprising: a plurality of electronic watermark data tables having a plurality of types of electronic watermark data for identifying the digital image data; an electronic watermark data selecting means for selecting one of the electronic watermark data tables; and an electronic watermark data embedding means for embedding the selected type of electronic watermark data in the digital image data, wherein at least one of the electronic watermark data tables has a predetermined electronic watermark data that does not affect the digital image data even if embedded in the digital image data.

In the image data encoding system, the predetermined electronic watermark data is composed of other than random numbers generated by an algorithm corresponding to a normal distribution.

The image data encoding system further comprises transforming means for transforming the digital image data into frequency components and outputting the resultant data to the electronic watermark data embedding means; a quantizing means for quantizing the data in which electronic watermark data has been embedded by the electronic watermark data embedding means; and a variable-length encoding means for encoding output data of the quantizing means into variable-length code. In the image data encoding system, the predetermined electronic watermark data is composed of other than random numbers generated by an algorithm corresponding to a normal distribution.

According to the further aspect of the present invention, there is provided an image inputting apparatus, which comprises: image pickup means for obtaining an analog image signal; analog-to-digital converting means for converting the analog image signal obtained by the image pickup means into image data; transforming means for transforming the image data into data in first frequency domain; storing means for temporarily storing the data in the first frequency domain; identification data holding means for holding identification data; means for adding the identification data to the data in the first frequency domain and generating data in second frequency domain; and selecting means for selecting either of the data in the first frequency domain and the data in the second frequency domain and outputting the selected data.

In the image inputting apparatus, the transforming means is an orthogonal transforming means.

The image inputting apparatus further comprises: compressing means for compressing and encoding the output signal of the selecting means.

According to still further aspect of the present invention, there is provided an image inputting apparatus, comprising: image pickup means for obtaining an analog image signal; analog-to-digital converting means for converting the analog image signal obtained by the image pickup means into image data; transforming means for transforming the image data into data in first frequency domain; storing means for temporarily storing the image data; identification data holding means for holding identification data; means for adding the identification data to the data in the first frequency domain and generating data in second frequency domain; inverse-transforming means for inversely transforming the data in the second frequency domain into data in time domain; and selecting means for selecting either of the output signal of the inverse-transforming means and the output signal of the storing means.

In the image inputting apparatus, the transforming means is an orthogonal transforming means and the inverse-transforming means is an inverse-transforming means.

The image inputting apparatus, further comprises: compressing means for compressing and encoding the output signal of the selecting means.

These and other objects, features and advantages of the present invention will become more apparent in light of the following detailed description of a best mode embodiment thereof, as illustrated in the accompanying drawings.

DESCRIPTION OF THE PREFERRED EMBODIMENTS

Next, with reference to the accompanying drawings, embodiments and examples of the present invention will be explained.

First Embodiment of Present Invention

Figure 1:
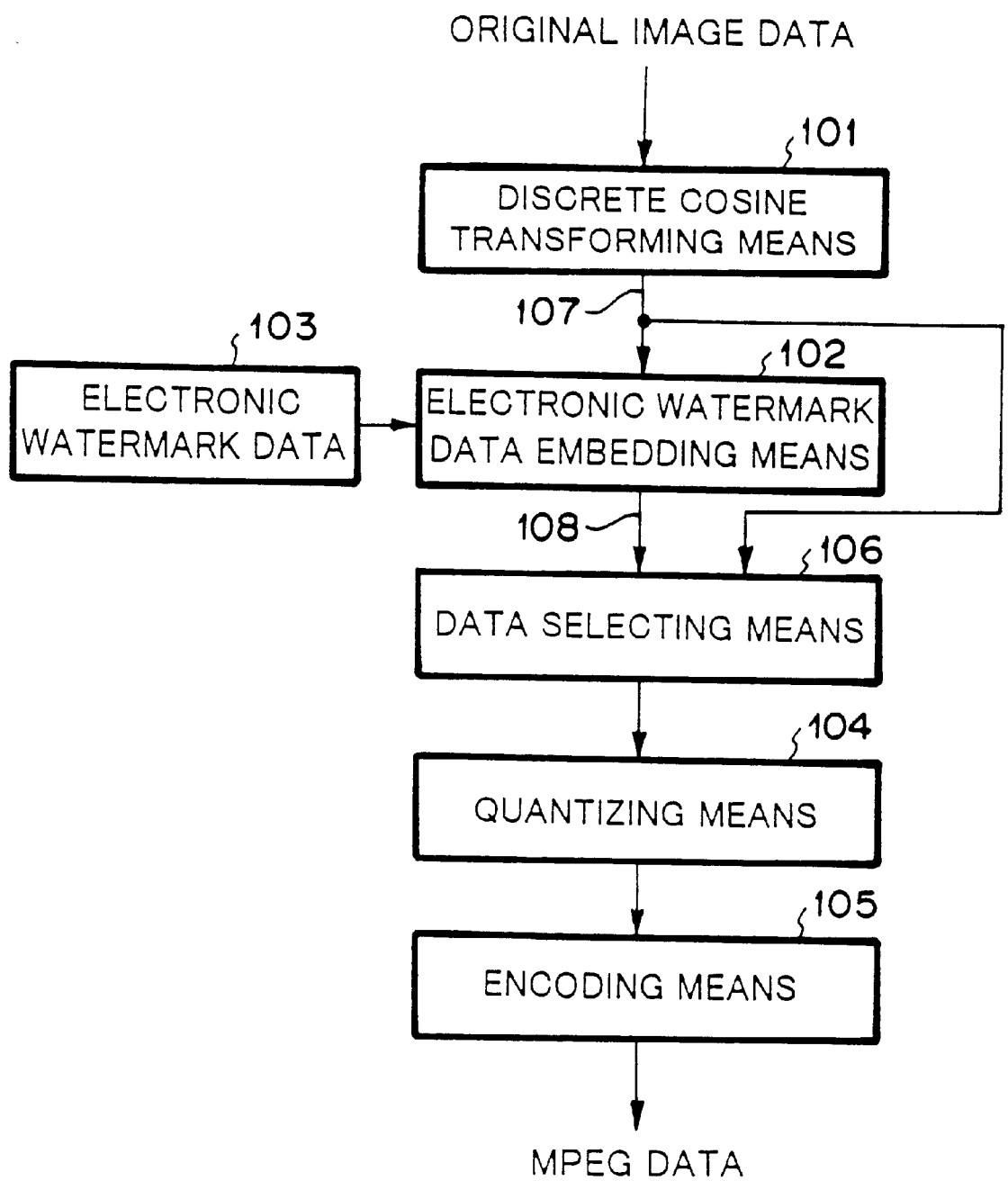
FIG. 1 is a block diagram showing the structure of an image data encoding system according of a first embodiment of the present invention.

With reference to FIG. 1, an image data encoding system according to a first embodiment of the present invention comprises discrete cosine transforming means 101, electronic watermark data embedding means 102, electronic watermark data 103, data selecting means 106, quantizing means 104, and encoding means 105. Discrete cosine transforming means 101 transforms input original image data in time domain into data in frequency domain. Electronic watermark data embedding means 102 embeds electronic watermark data 103 in the data in frequency domain. Data selecting means 106 alternatively selects output signal 107 of discrete cosine transforming means 101 or output signal 108 of electronic watermark data embedding means 102. Quantizing means 104 quantizes data selected by data selecting means 106. Encoding means 105 encodes the quantized data received from quantizing means 104 and generates MPEG data.

Next, the operation of the system shown in FIG. 1 will be explained.

Discrete cosine transforming means 101 converts the original image data in time domain into data in frequency domain. Electronic watermark data embedding means 102 embeds electronic watermark data 103 in the data in frequency domain.

Output signal 108 of electronic watermark data embedding means 102 is supplied to one input terminal of data selecting means 106. Output signal 107 of discrete cosine transforming means 101 is supplied to an input terminal of electronic watermark data embedding means 102. In addition, output signal 107 is supplied to the other input terminal of data selecting means 106. When the electronic watermark data 103 should be embedded in the original image data, data selecting means 106 selects output signal 108. When the electronic watermark data 103 should not be embedded in the original image data, data selecting means 106 selects output signal 107.

Quantizing means 104 quantizes the data selected by data selecting means 106. Encoding means 105 encodes the quantized data and outputs MPEG data.

First Example of Present Invention

Next, with reference to FIG. 2, a first example according to the first embodiment of the present invention will be explained.

Figure 2:
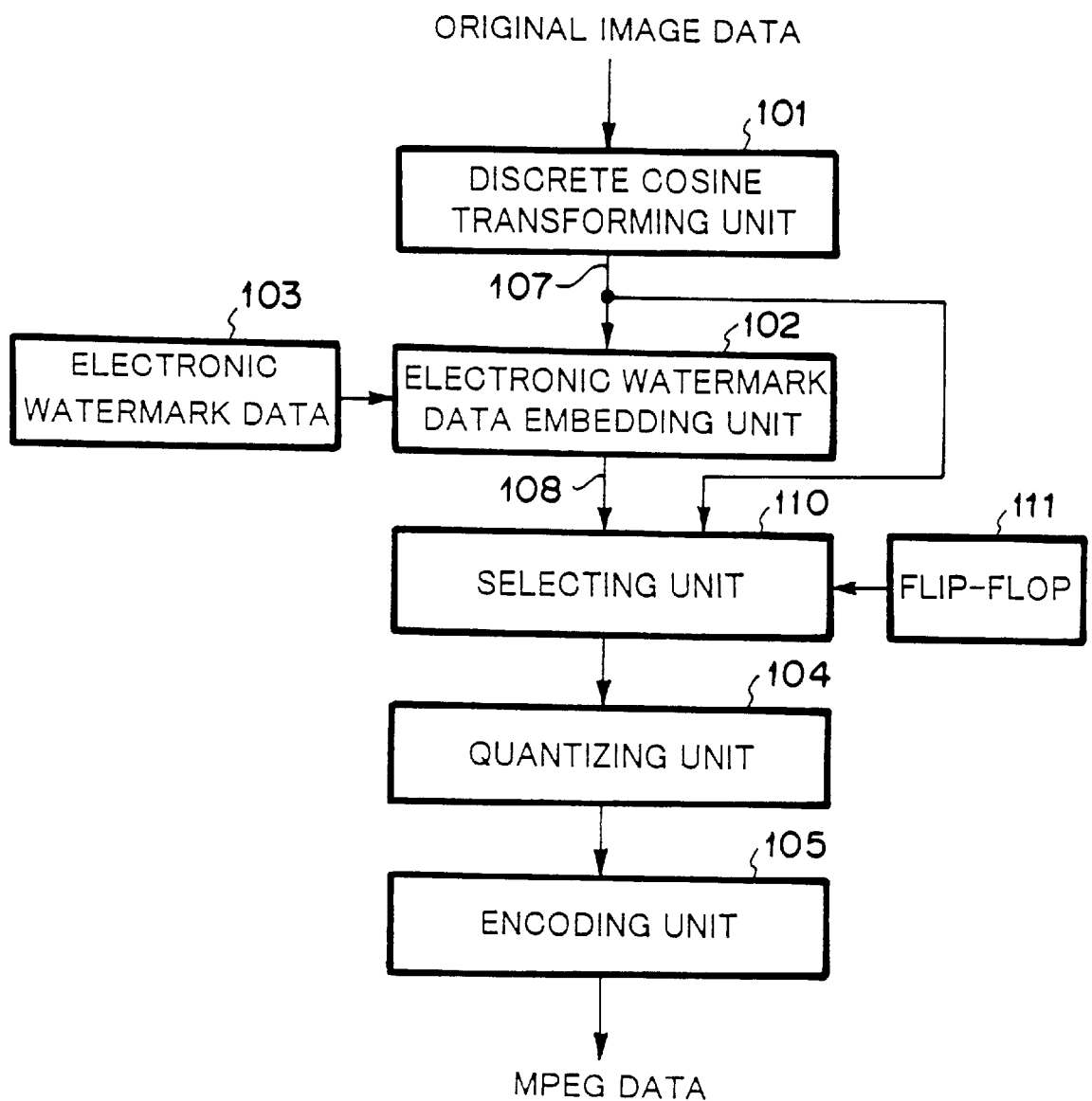
FIG. 2 is a block diagram showing the structure of an image data encoding system according to a first example of the present invention.

With reference to FIG. 2, output signal 107 of discrete cosine transforming unit 101 or output signal 108 of electronic watermark data embedding unit 102 is alternatively selected by selecting unit 110 that operates corresponding to information stored in flip-flop 111. When the electronic watermark data should not be embedded in the image data, a logic value "0" is stored in flip-flop 111. When the electronic watermark data should be embedded in the original image data, a logic value "1" is stored in flip-flop 111.

Discrete cosine transforming unit 101 orthogonally transforms original image data in time domain into data in frequency domain. Electronic watermark data embedding unit 102 embeds electronic watermark data 103 in the data in frequency domain.

Output signal 108 of electronic watermark data embedding unit 102 is supplied to one input terminal of selecting unit 110. Output signal 107 of discrete cosine transforming unit 101 is supplied to an input terminal of electronic watermark data embedding unit 102. In addition, output signal 107 of discrete cosine transforming unit 101 is supplied to the other input terminal of selecting unit 110. When the information of flip-flop 111 represents the logical value '0', selecting unit 110 selects output signal 107. When the information of flip-flop 111 represents the logical value '1', selecting unit 110 selects output signal 108.

Quantizing unit 104 quantizes the data selected by selecting unit 110. Encoding unit 105 encodes the quantized data and outputs MPEG data.

Second Example of Present Invention

Next, with reference to FIG. 3, a second example according to the first embodiment of the present invention will be explained.

Figure 3:
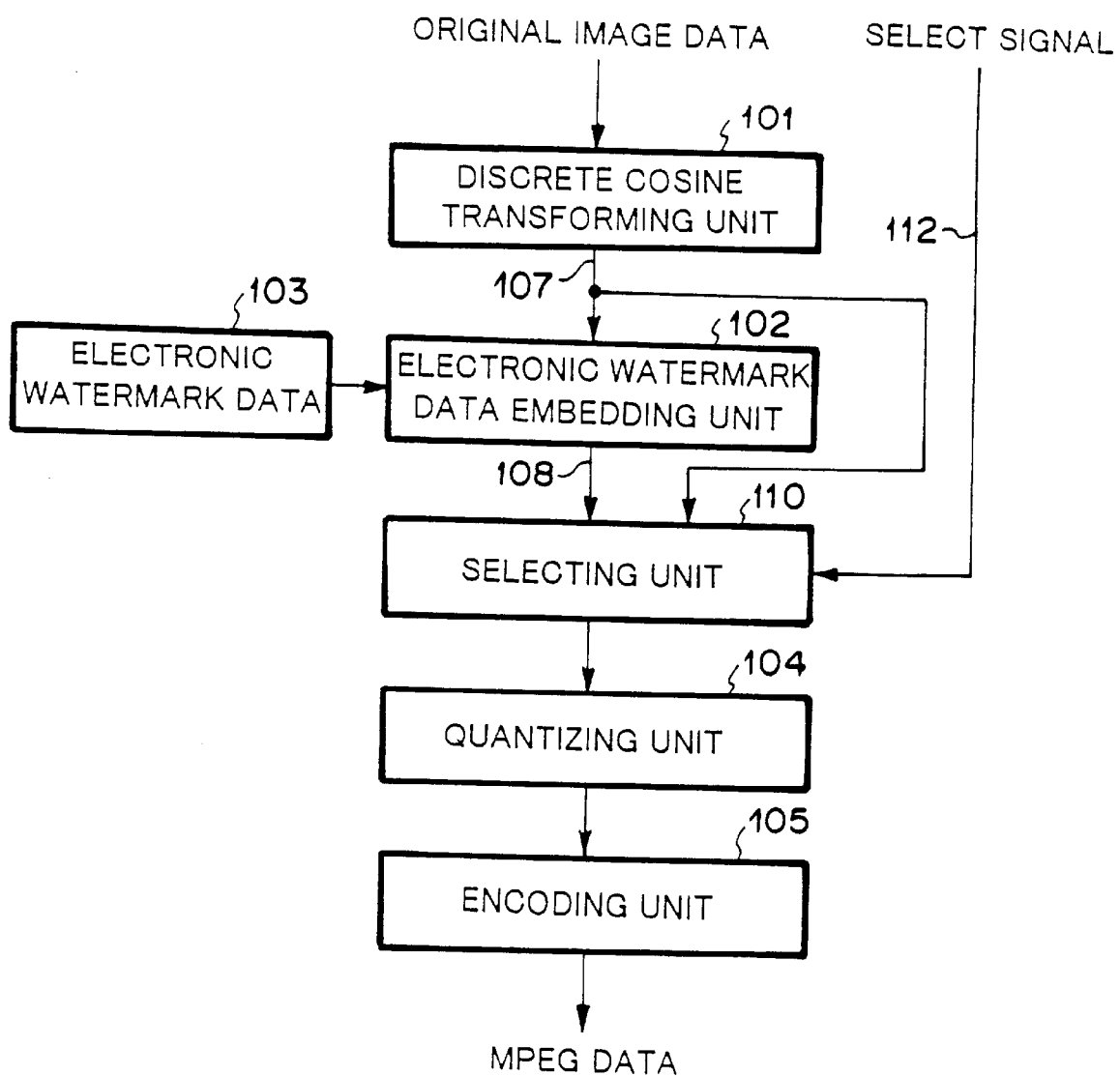
FIG. 3 is a block diagram showing the structure of an image data encoding system according to a second example of the present invention.

Referring to FIG. 3, output signal 107 of discrete cosine transforming unit 101 and output signal 108 of electronic watermark data embedding unit 102 is alternatively selected by selecting unit 110 corresponding to external signal 112. When electronic watermark data 103 should not be embedded in image data, a logical value '0' is set to external signal 112. When electronic watermark data should be embedded in image data, a logical value '1' is designated to external signal 112.

Discrete cosine transforming unit 101 orthogonally transforms original image data in time domain into data in frequency domain. Electronic watermark data embedding unit 102 embeds electronic watermark data 103 in the data in frequency domain.

Output signal 108 of electronic watermark data embedding unit 102 is supplied to one input terminal of selecting unit 110. Output signal 107 of discrete cosine transforming unit 101 is supplied to an input terminal of electronic watermark data embedding unit 102. In addition, output signal 107 is supplied to the other input terminal of selecting unit 110. When external signal 112 represents the logical value '0', selecting unit 110 selects output signal 107. When external signal 112 represents the logical value '1', selecting unit 110 selects output signal 108.

Quantizing unit 104 quantizes the data selected by selecting unit 110. Encoding unit 105 encodes the quantized data and outputs MPEG data.

Second Embodiment of Present Invention

Next, with reference to FIG. 4, an image data encoding system according to a second embodiment of the present invention will be explained.

Figure 4:
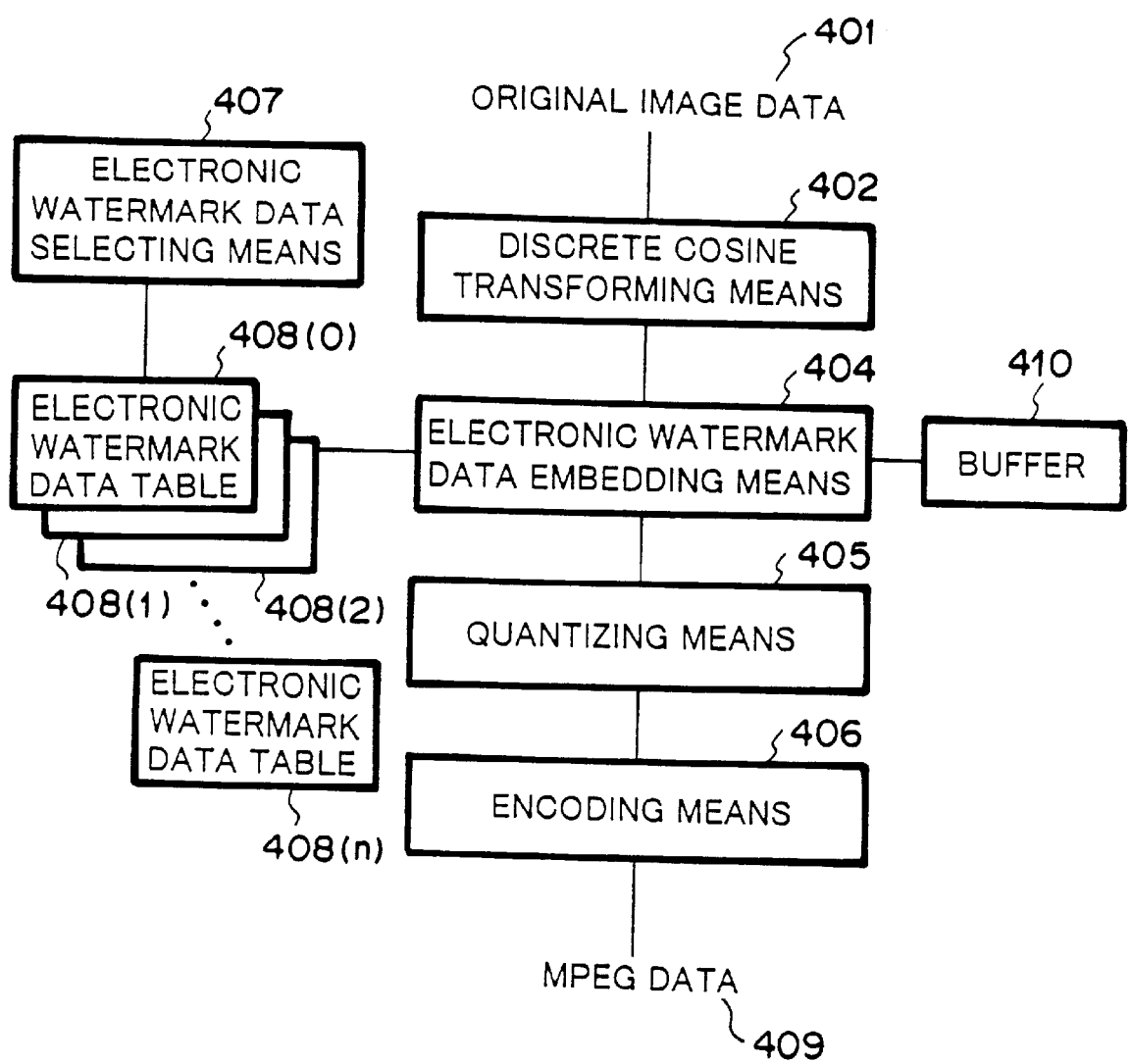
FIG. 4 is a block diagram showing the structure of an image data encoding system according of a second embodiment of the present invention.

FIG. 4 is a block diagram showing the structure of the image data encoding system according to the second embodiment of the present invention. In FIG. 4, the image data encoding system comprises discrete cosine transforming means 402, a plurality of electronic watermark data tables 408(0), 408(1), 408(2) . . . 408(n), electronic watermark data selecting unit 407, electronic watermark data embedding means 404, quantizing means 405, and encoding means 406. Discrete cosine transforming means 402 performs a discrete cosine transforming process for original image stream 401 to be encoded. Electronic watermark data tables 408(0), 408(1), 408(2), . . . , 408(n) have respective electronic watermark data. Electronic watermark data selecting unit 407 selects one of electronic watermark data tables 408(0), 408(1) , 408(2), . . . , 408(n). Electronic watermark data embedding means 404 embeds electronic watermark data in the data that is received from discrete cosine transforming means 402 and then temporarily stored in buffer 410. Quantizing means 405 quantizes data received from electronic watermark data embedding means 404. Encoding means 406 encodes data received from quantizing means 405 into variable-length code and outputs resultant MPEG data 409.

Among the plurality of electronic watermark data tables 408(0) to 408(n), watermark data table 408(0) has electronic data that does not affect digital image data. In other words, the electronic watermark data table 408(0) does not have random numbers generated by an algorithm of generating random numbers in a normal distribution. On the other hand, electronic watermark data tables 408(1) to 408(n) have random numbers generated by the algorithm.

Next, the operation of the image data encoding system according to the second embodiment of the present invention will be explained.

First of all, the case in which normal electronic watermark data is embedded in image data will be explained. Original image data 401 is extracted in the unit of (8×8 pixel) block. Discrete cosine transforming means 402 performs a discrete cosine transforming process for the extracted data and then transforms the data into frequency components. Electronic watermark data selecting means 407 selects electronic watermark data from one of the electronic watermark data tables 408(1) to 408(n) except for electronic watermark data table 408(0) and outputs the selected electronic watermark data to electronic watermark data embedding means 404. Electronic watermark data embedding means 404 embeds the selected electronic watermark data in the frequency components. Quantizing means 405 quantizes data received from electronic watermark data embedding means 404. Encoding means 406 encodes quantized data and outputs resultant MPEG data 409.

Next, the case in which encoded data corresponding to original data is required is explained. Similarly to the normal case, original image data 401 is extracted in the unit of (8×8 pixel) block corresponding to the conventional MPEG compressing process. Discrete cosine transforming means 402 performs a discrete cosine transforming process for the extracted data and then transforms the extracted data into frequency components. Electronic watermark data selecting means 407 selects electronic watermark data that does not affect digital image data from the electronic watermark data table 408(0) and outputs the selected electronic watermark data to electronic watermark data embedding means 404. Electronic watermark data embedding means 404 embeds the selected electronic watermark data in the frequency components. Quantizing means 405 quantizes the data received from electronic watermark data embedding means 404. Encoding means 406 encodes the quantized data and outputs resultant MPEG data 409.

Third Embodiment of Present Invention

Figure 5:
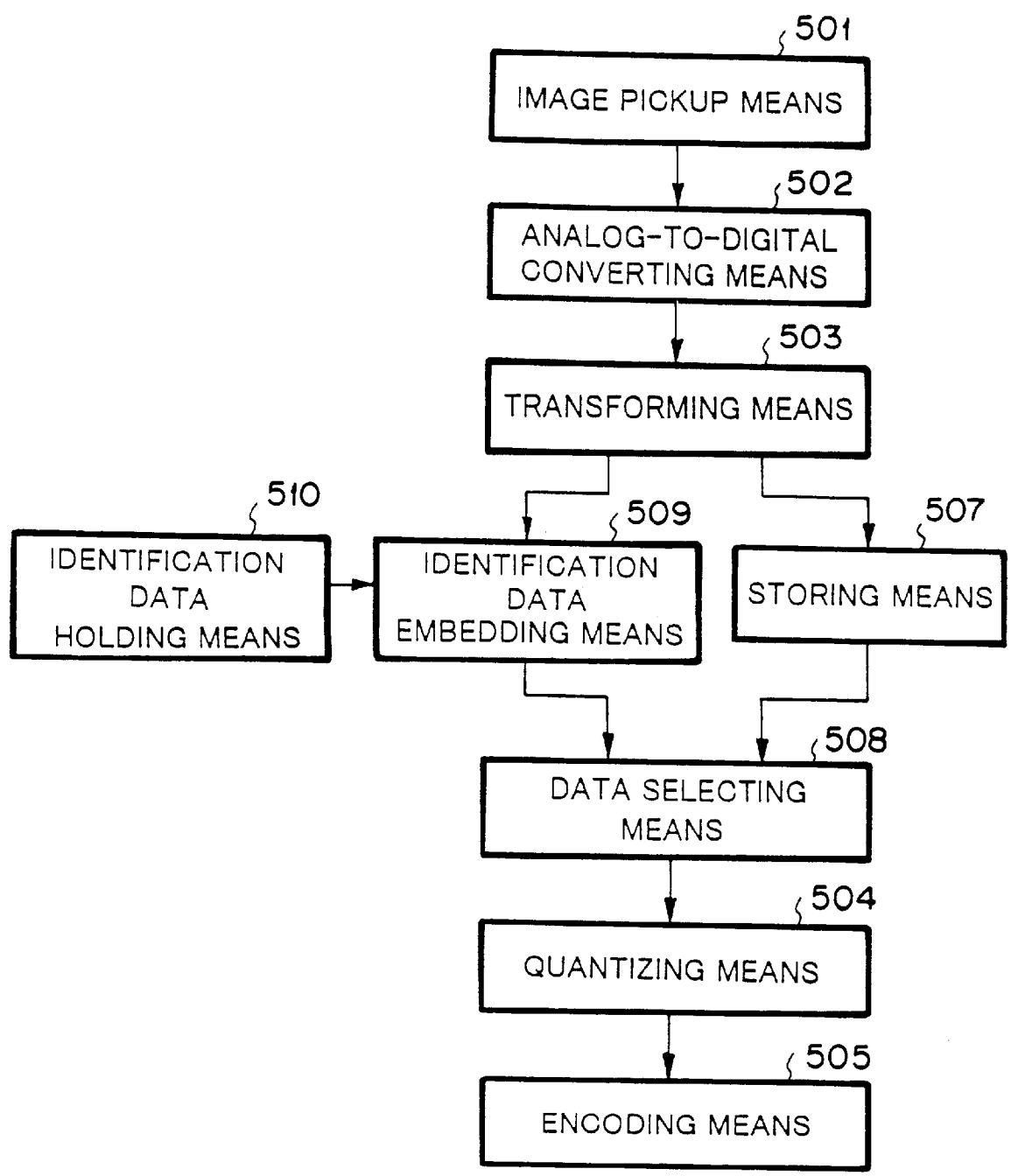
FIG. 5 is a block diagram showing the structure of an image inputting apparatus according to a third embodiment of the present invention.

Next, with reference to FIG. 5, the basic structure of an image inputting apparatus according to a third embodiment of the present invention will be explained. With reference to FIG. 5, the image inputting apparatus comprises image pickup means 501, analog-to-digital converting means 502, transforming means 503, storing means 507, identification data holding means 510, identification data embedding means 509, data selecting means 508, quantizing means 504, and encoding means 505. Image pickup means 501 picks up an external image. Analog-to-digital converting means 502 converts an analog signal of the picked-up image into digital image data. Transforming means 503 transforms the image data in space domain into data in frequency domain. Storing means 507 temporarily stores the image data in frequency domain. Identification data holding means 510 holds identification data. Identification data embedding means 509 embeds the identification data in the image data in frequency domain. Data selecting means 508 selects an output signal of storing means 507 or an output signal of identification data embedding means 509. Quantizing means 504 quantizes image data. Encoding means 505 encodes the quantized image data into variable-length code.

Next, the operation of the image inputting apparatus according to the third embodiment of the present invention will be explained. Image pickup means 501 picks up an external image and outputs the analog signal of the picked-up image. Analog-to-digital converting means 502 converts the analog signal into digital image data and outputs the digital image data. Transforming means 503 orthogonally transforms the image data in space domain into image data in frequency domain and outputs the resultant image data. Storing means 507 temporarily stores the image data in frequency domain. Identification data holding means 510 holds and outputs identification data. Identification data embedding means 509 embeds the identification data in the image data in frequency domain and outputs the resultant data. Data selecting means 508 selects an output signal of storing means 507 or an output signal of identification data embedding means 509 and outputs the selected signal. The quantizing means 504 quantizes the image data and outputs the resultant data. The encoding means 505 encodes the quantized image data into variable-length code and outputs compressed image data.

Third Example of Present Invention

Figure 6:
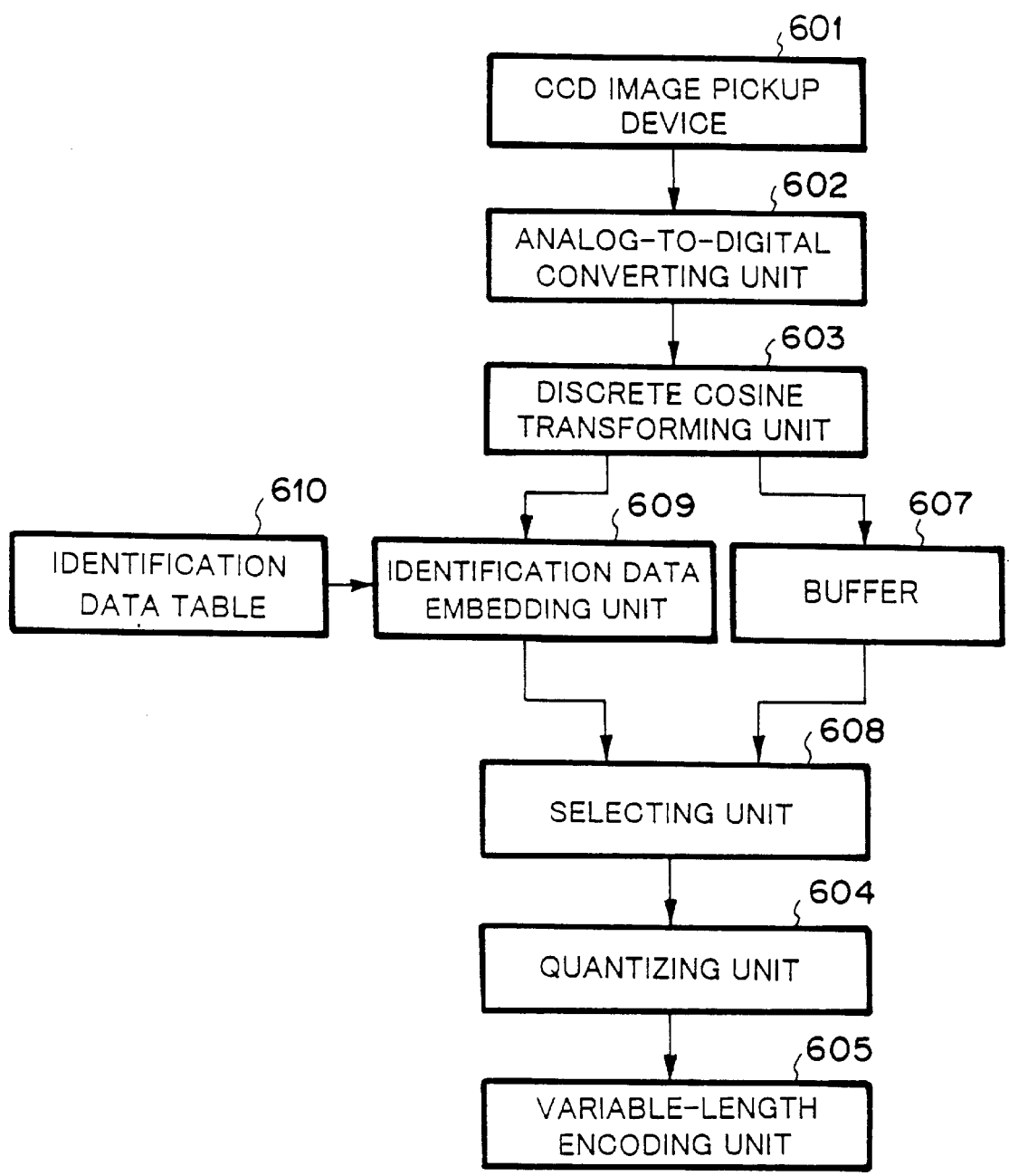
FIG. 6 is a block diagram showing the structure of an image inputting apparatus according to a third example of the present invention.

Next, with reference to FIG. 6, a third example according to the third embodiment of the present invention will be explained. Referring to FIG. 6, CCD image pickup device 601 picks up an external image and outputs the analog signal of the picked-up image. Analog-to-digital converting unit 602 converts the analog signal into digital image data and outputs the digital image data.

Discrete cosine transforming unit 603 orthogonally transforms the image data in space domain into data in frequency domain. Buffer 607 temporarily stores image data in frequency domain. Identification data table 610 holds and outputs identification data. Identification data embedding unit 609 embeds the identification data in the image data in frequency domain and outputs the resultant data.

Selecting unit 608 alternatively selects an output signal of buffer 607 or an output signal of identification data embedding unit 609. When the output signal of buffer 607 is selected, the original image data is output. When the output signal of identification data embedding unit 609 is selected, image data in which the identification data is embedded is output.

Quantizing unit 604 quantizes image data and outputs the quantized image data. Variable-length encoding unit 605 encodes the quantized image data in variable-length code and outputs the resultant MPEG data. The MPEG data is supplied to for example a personal computer, a storage medium processing unit (such as an optical magnetic medium), a network processing unit (that transmits the data to a network line), or a radio media processing unit (that transmits the data to a radio channel).

Figure 7:
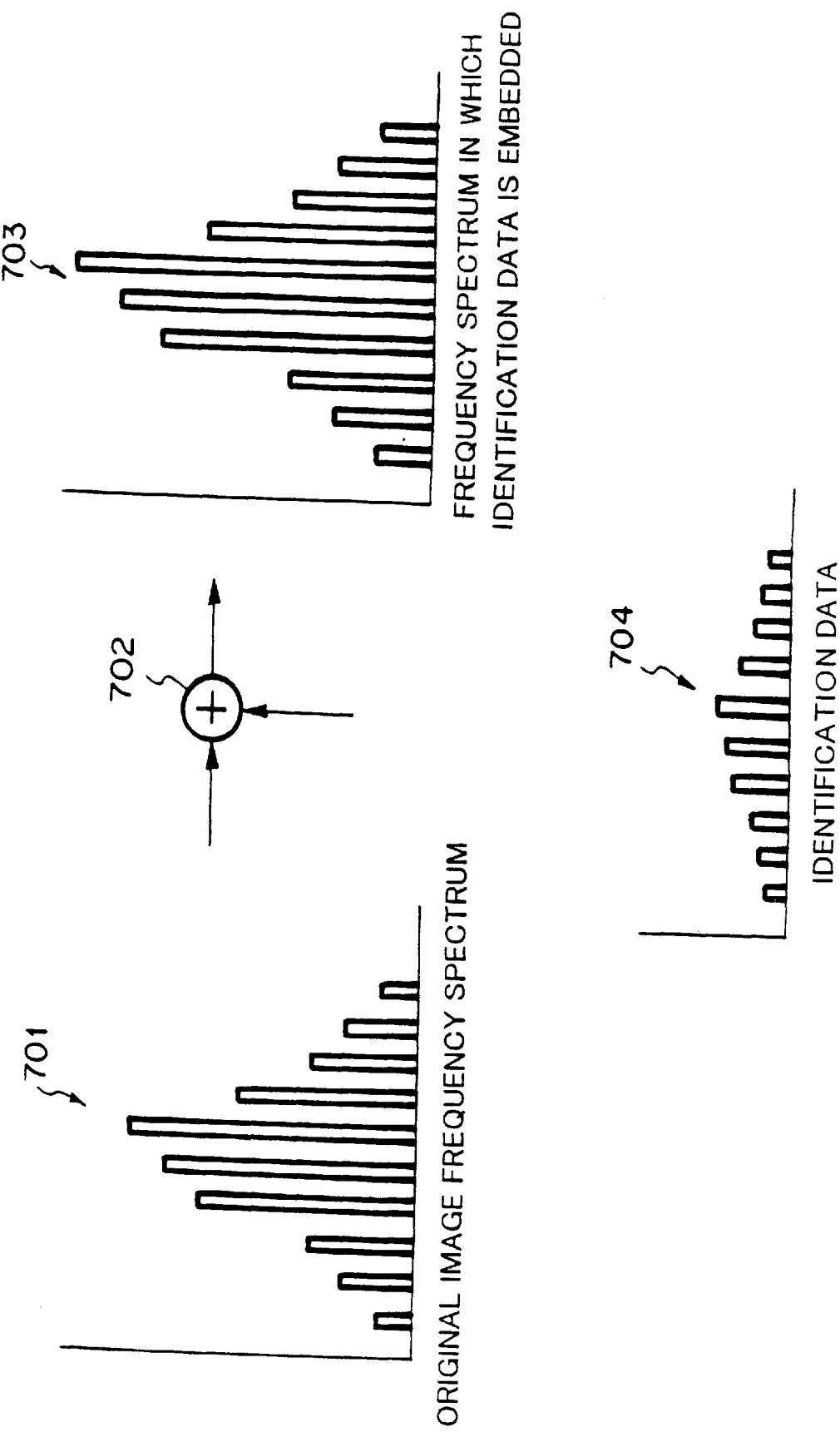
FIG. 7 is a schematic diagram for explaining an embedment of identification data in frequency domain according to the third example of the present invention.

Next, with reference to FIG. 7, an embedding method of identification data will be explained. When image data in space domain is orthogonally transformed into data in frequency domain by discrete cosine transforming unit 603, a frequency spectrum 701 shown in FIG. 7 is generated. Identification data table 610 outputs the identification data with a frequency spectrum 704 shown in FIG. 7. Frequency spectrum 704 is similar to the spectrum 701. When adding unit 702 adds frequency spectrum 704 of the identification data to frequency spectrum 701 of the original image, a frequency spectrum 703 in which the identification data is embedded is obtained.

To extract the identification data, a subtracting unit (not shown) extracts frequency spectrum 701 of the original image from frequency spectrum 703 in which the identification data is embedded and obtains frequency spectrum 704 of the identification data. Thus, the identification data can be easily extracted.

Fourth Example of Present Invention

Figure 8:
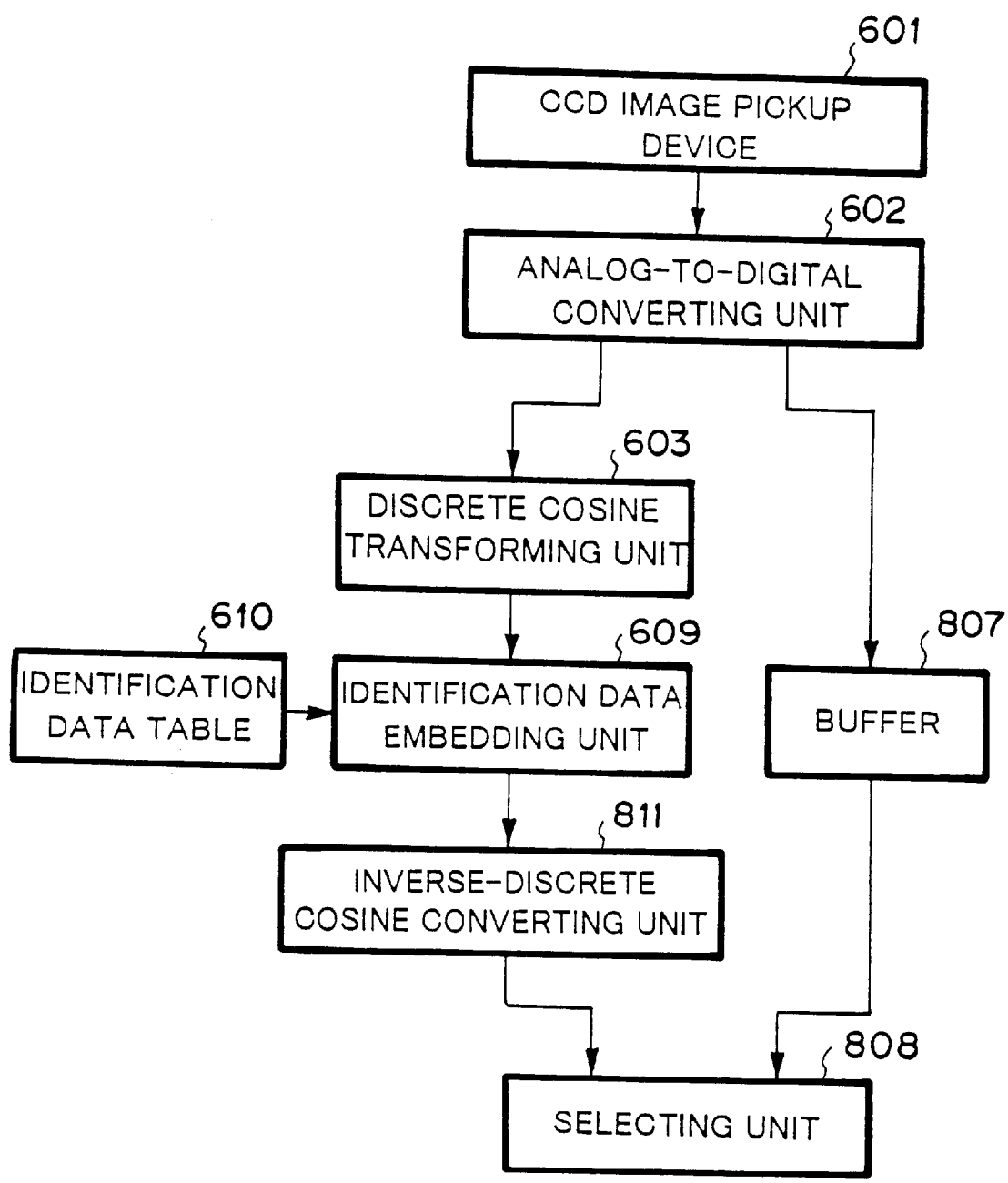
FIG. 8 is a block diagram showing the structure of an image inputting apparatus according to a fourth example of the present invention.
Figure 9:
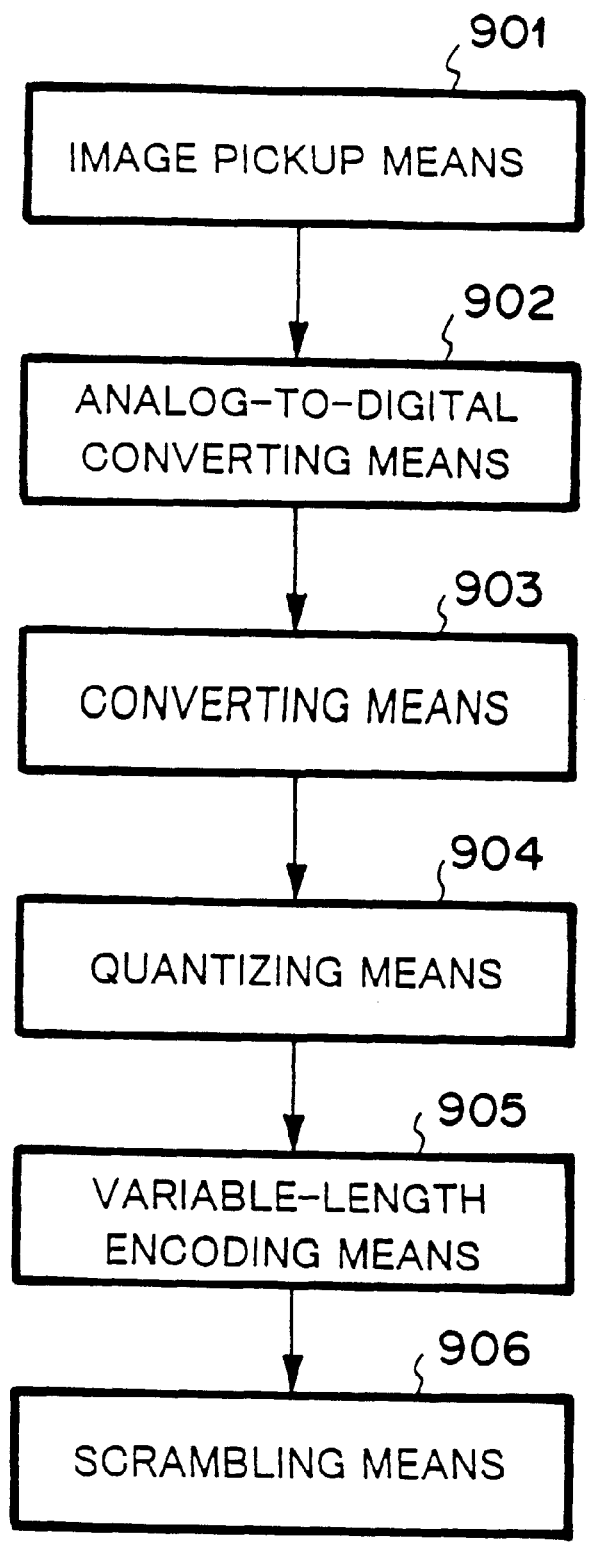
FIG. 9 is a block diagram showing an example of the structure of a conventional image inputting apparatus.
Figure 10:
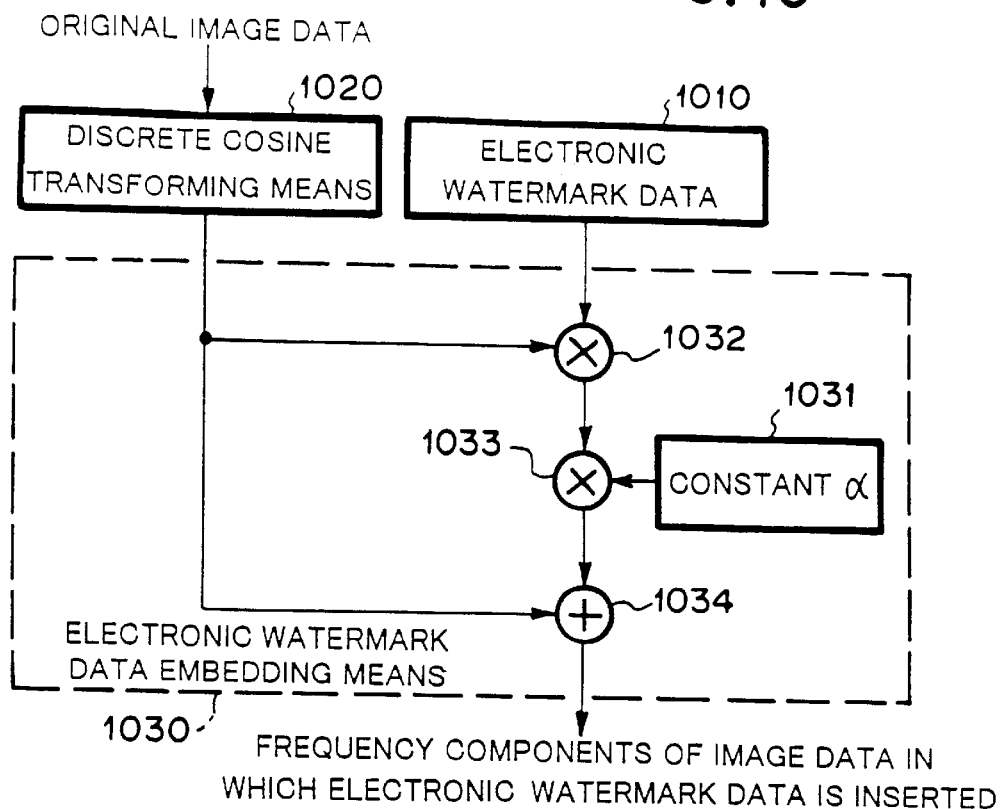
FIG. 10 is a block diagram for explaining an electronic watermark data embedding method according to a related art reference.
Figure 11:
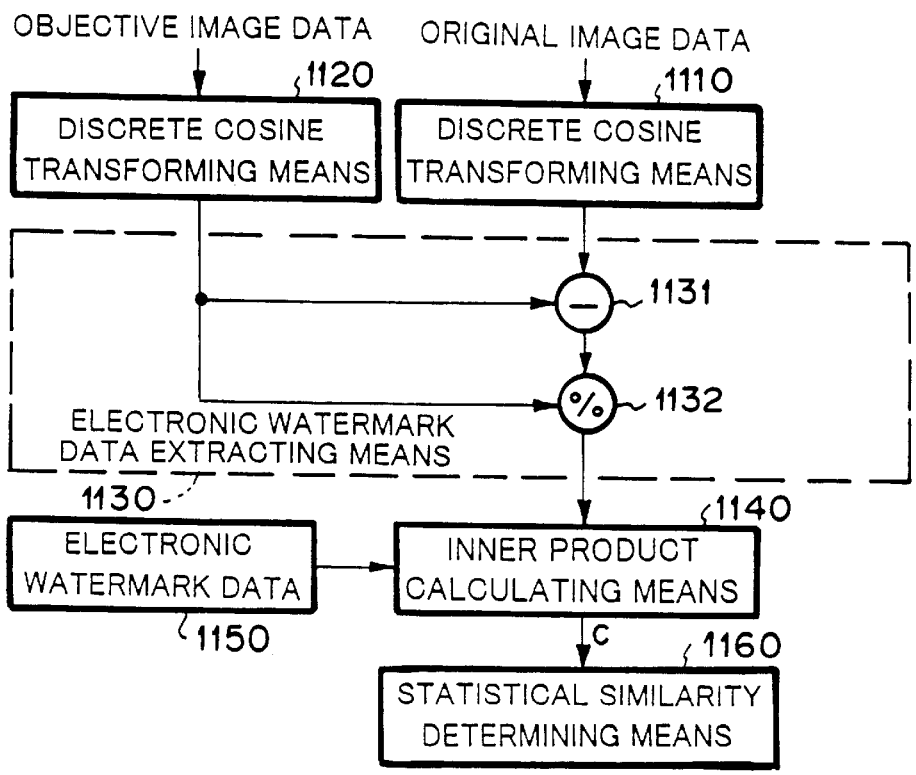
FIG. 11 is a block diagram for explaining an electronic watermark data detecting method according to a related art reference.
Figure 12:
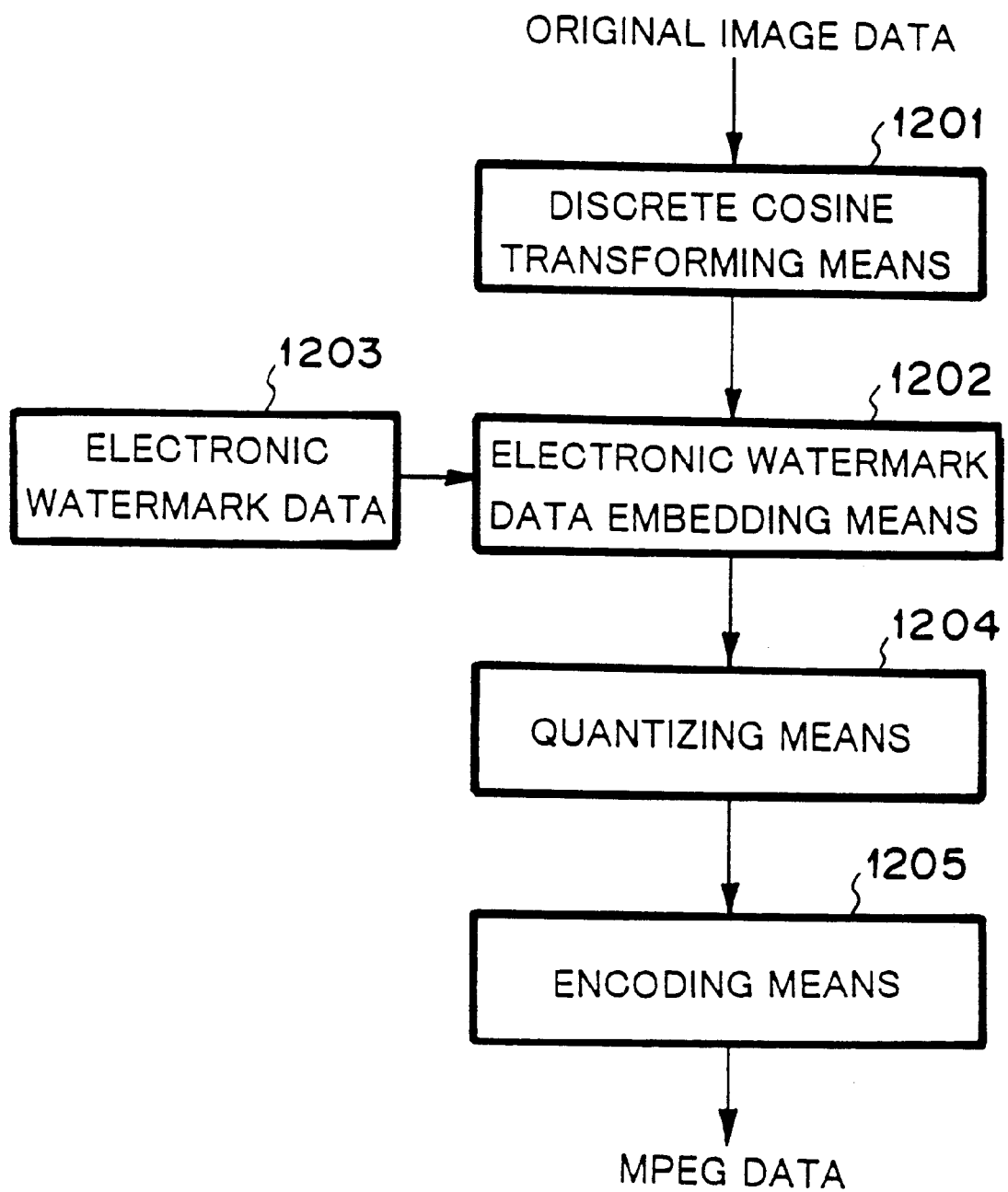
FIG. 12 is a block diagram showing the structure of an image data encoding system according to a related art reference.

Next, with reference to FIG. 8, a fourth example according to the third embodiment of the present invention will be explained. Referring to FIG. 8, CCD image pickup device 601 picks up an external image and outputs the analog signal of the picked-up image. Analog-to-digital converting unit 602 converts the analog signal into digital image data and outputs the image data. Buffer 807 temporarily stores the digital image data.

Discrete cosine transforming unit 603 orthogonally transforms image data in space domain into data in frequency domain and outputs the resultant data. Identification data table 610 holds and outputs identification data. Identification data embedding unit 609 embeds the identification data in the image data in frequency domain and outputs the resultant data. Inverse discrete cosine transforming unit 811 transforms the image data in frequency domain into data in space domain and outputs the resultant image data. The image data in frequency domain may be converted into the image data in space domain by fast Fourier transforming method rather than the discrete cosine transforming method.

Selecting unit 808 alternatively selects the output signal of buffer 807 or the output signal of inverse discrete cosine transforming unit 811. When the output signal of buffer 807 is selected, the original image data is output. When the output signal of inverse discrete cosine transforming unit 811 is selected, the image data in which the identification data is embedded is output.

Since the embedding method of the identification data according to the fourth example is the same as that of the third example, the description thereof is omitted. To extract the identification data, the discrete cosine transforming means orthogonally transforms the image data in space domain into the image data in frequency domain. Thereafter, a subtracting unit (not shown) subtracts the frequency spectrum of the original image data from the frequency spectrum in which the identification data is embedded and obtains the frequency spectrum of the identification data.

As explained above, according to the present invention, since both image data with electronic watermark data and image data without electronic watermark data can be encoded by one encoding system rather than two encoding systems, the hardware scale can be remarkably reduced.

According to the present invention, even if image data is illegally copied, it can be identified. This is because identification data has been embedded in the image data. Thus, by detecting the identification data, the route of the illegal copy can be tracked.

In addition, when identification data is deleted or destroyed and thereby original image data thereof is illegally copied, the image quality of the image data remarkably deteriorates. Thus, the image data can be prevented from being illegally forged and copied.

Although the present invention has been shown and explained with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An image data encoding system for encoding digital image data in a predetermined encoding manner and outputting the resultant image data, which comprises:
   an electronic watermark embedding means for embedding electronic watermark data selected from a plurality of types of electronic watermark data to said digital image data,
   wherein at least one of the plurality of types of electronic watermark data is predetermined electronic watermark data which does not affect said digital image data even if embedded in said digital image data.

2. The image data encoding system as set forth in claim 1,
   wherein said predetermined electronic watermark data is composed of other than random numbers generated by an algorithm corresponding to a normal distribution.

3. The image data encoding system as set forth in claim 1, which further comprises:
   transforming means for transforming said digital image data into frequency components and outputting the resultant data to said electronic watermark data embedding means;
   quantizing means for quantizing the data in which electronic watermark data has been embedded by said electronic watermark data embedding means; and
   a variable-length encoding means for encoding output data of said quantizing means into variable-length code.

4. The image data encoding system as set forth in claim 20,
   wherein the predetermined electronic watermark data is composed of other than random numbers generated by an algorithm corresponding to a normal distribution.

5. An image data encoding system for encoding digital image data in a predetermined manner and outputting the resultant data, comprising:
   a plurality of electronic watermark data tables having a plurality of types of electronic watermark data for identifying said digital image data;
   an electronic watermark data selecting means for selecting one of said electronic watermark data tables; and
   an electronic watermark data embedding means for embedding the selected type of electronic watermark data in said digital image data,
   wherein at least one of said electronic watermark data tables has a predetermined electronic watermark data which does not affect said digital image data even if embedded in the digital image data.

6. The image data encoding system as set forth in claim 5,
   wherein said predetermined electronic watermark data is composed of other than random numbers generated by an algorithm corresponding to a normal distribution.

7. The image data encoding system as set forth in claim 5, which further comprises:
   transforming means for transforming said digital image data into frequency components and outputting the resultant data to said electronic watermark data embedding means;
   a quantizing means for quantizing the data in which electronic watermark data has been embedded by said electronic watermark data embedding means; and
   a variable-length encoding means for encoding output data of said quantizing means into variable-length code.

8. The image data encoding system as set forth in claim 7,
   wherein said predetermined electronic watermark data is composed of other than random numbers generated by an algorithm corresponding to a normal distribution.

9. An image inputting apparatus, which comprises:
   image pickup means for obtaining an analog image signal;
   analog-to-digital converting means for converting said analog image signal obtained by said image pickup means into image data;
   transforming means for transforming said image data into data in first frequency domain;
   storing means for temporarily storing the data in said first frequency domain;
   identification data holding means for holding identification data;
   means for adding said identification data to the data in the first frequency domain and generating data in second frequency domain; and
   selecting means for selecting either of the data in said first frequency domain and the data in said second frequency domain and outputting the selected data.

10. The image inputting apparatus as set forth in claim 9,
    wherein said transforming means is an orthogonal transforming means.

11. The image inputting apparatus as set forth in claim 9, which further comprises:
    compressing means for compressing and encoding the output signal of said selecting means.

12. An image inputting apparatus, comprising:
    image pickup means for obtaining an analog image signal;
    analog-to-digital converting means for converting said analog image signal obtained by said image pickup means into image data;

transforming means for transforming said image data into data in first frequency domain;

storing means for temporarily storing said image data;

identification data holding means for holding identification data;

means for adding the identification data to the data in said first frequency domain and generating data in second frequency domain;

inverse-transforming means for inversely transforming the data in said second frequency domain into data in time domain; and selecting means for selecting either of the output signal of said inverse-transforming means and the output signal of said storing means.

13. The image inputting apparatus as set forth in claim 12, wherein said transforming means is an orthogonal transforming means and said orthogonal inverse-transforming means is an orthogonal inverse-transforming means.

14. The image inputting apparatus as set forth in claim 12, which further comprises:

compressing means for compressing and encoding the output signal of said selecting means.

15. An image data encoding system for encoding digital image data in a predetermined encoding manner and outputting the resultant image data, which comprises:

an electronic watermark embedding unit for embedding electronic watermark data selected from a plurality of types of electronic watermark data to said digital image data, wherein at least one of the plurality of types of electronic watermark data is predetermined electronic watermark data which does not affect said digital image data even if embedded in said digital image data.

16. The image data encoding system as set forth in claim 15, wherein said predetermined electronic watermark data is composed of other than random numbers generated by an algorithm corresponding to a normal distribution.

17. The image data encoding system as set forth in claim 15, which further comprises:

a transforming unit for transforming said digital image data into frequency components and outputting the resultant data to said electronic watermark data embedding unit;

a quantizing unit for quantizing the data in which electronic watermark data has been embedded by said electronic watermark data embedding unit; and a variable-length encoding unit for encoding output data of said quantizing unit into variable-length code.

18. The image data encoding system as set forth in claim 17, wherein the predetermined electronic watermark data is composed of other than random numbers generated by an algorithm corresponding to a normal distribution.

19. An image data encoding system for encoding digital image data in a predetermined manner and outputting the resultant data, comprising:

a plurality of electronic watermark data tables having a plurality of types of electronic watermark data for identifying said digital image data;

an electronic watermark data selecting unit for selecting one of said electronic watermark data tables; and an electronic watermark data embedding unit for embedding the selected type of electronic watermark data in said digital image data, wherein at least one of said electronic watermark data tables has a predetermined electronic watermark data which does not affect said digital image data even if embedded in the digital image data.

20. The image data encoding system as set forth in claim 19, wherein said predetermined electronic watermark data is composed of other than random numbers generated by an algorithm corresponding to a normal distribution.

21. The image data encoding system as set forth in claim 19, which further comprises:

a transforming unit for transforming said digital image data into frequency components and outputting the resultant data to said electronic watermark data embedding unit;

a quantizing unit for quantizing the data in which electronic watermark data has been embedded by said electronic watermark data embedding unit; and a variable-length encoding unit for encoding output data of said quantizing unit into variable-length code.

22. The image data encoding system as set forth in claim 21, wherein said predetermined electronic watermark data is composed of other than random numbers generated by an algorithm corresponding to a normal distribution.

23. An image inputting apparatus, which comprises:

an image pickup unit for obtaining an analog image signal;

an analog-to-digital converting unit for converting said analog image signal obtained by said image pickup unit into image data;

a transforming unit for transforming said image data into data in first frequency domain;

a storing unit for temporarily storing the data in said first frequency domain;

an identification data holding unit for holding only digital identification data;

a unit for adding said identification data to the data in the first frequency domain and generating data in second frequency domain; and a selecting unit for selecting either of the data in said first frequency domain and the data in said second frequency domain and outputting the selected data.

24. The image inputting apparatus as set forth in claim 23, wherein said transforming unit is an orthogonal transforming unit.

25. The image inputting apparatus as set forth in claim 23, which further comprises:

a compressing unit for compressing and encoding the output signal of said selecting unit.

26. An image inputting apparatus, comprising:

an image pickup unit for obtaining an analog image signal;

an analog-to-digital converting unit for converting said analog image signal obtained by said image pickup unit into image data;

a transforming unit for transforming said image data into data in first frequency domain;

a storing unit for temporarily storing said image data;

an identification data holding unit for holding identification data;

a unit for adding the identification data to the data in said first frequency domain and generating data in second frequency domain;

an inverse-transforming unit for inversely transforming the data in said second frequency domain into data in time domain; and a selecting unit for selecting either of the output signal of said inverse-transforming unit and the output signal of said storing unit.

27. The image inputting apparatus as set forth in claim 26, wherein said transforming unit is an orthogonal transforming unit and said orthogonal inverse-transforming unit is an orthogonal inverse-transforming unit.

28. The image inputting apparatus as set forth in claim 26, which further comprises:

a compressing unit for compressing and encoding the output signal of said selecting unit.

* * * * *